United States Patent [19]

Tachimori et al.

[11] Patent Number: 4,902,874
[45] Date of Patent: Feb. 20, 1990

[54] ANTI-FROST SYSTEM FOR A WINDSHIELD OF A MOTOR VEHICLE

[75] Inventors: Takeshi Tachimori, Oota; Hirohisa Takada, Fukaya, both of Japan

[73] Assignee: Fuji Jukogyo Kabushiki Kaisha, Tokyo, Japan

[21] Appl. No.: 260,803

[22] Filed: Oct. 20, 1988

[30] Foreign Application Priority Data

Oct. 28, 1987 [JP] Japan .................. 62-273995

[51] Int. Cl.⁴ .............................. B60L 1/02
[52] U.S. Cl. ............................ 219/203; 219/522; 219/547; 307/10.1
[58] Field of Search ............ 219/203, 522, 547; 307/10.1

[56] References Cited

U.S. PATENT DOCUMENTS 4,084,126 4/1978 Clements .................. 219/203
4,539,466 9/1985 Yamamoto ............... 219/547 X
4,725,710 2/1988 Ramus et al. ............. 219/203
4,730,097 3/1988 Campbell et al. .......... 219/547 X

FOREIGN PATENT DOCUMENTS 58-174046 10/1983 Japan .

Primary Examiner—C. L. Albritton
Attorney, Agent, or Firm—Martin A. Farber

[57] ABSTRACT

A system for preventing frost from accumulating on a window of a motor vehicle has a heating element provided on the window, a temperature switch, which is closed when the temperature of window is lower than 0° C., and a humidity switch, which is closed when the humidity of air outside of the window becomes slightly lower than 100% relative humidity. When both the switches are closed, an electric circuit is closed to connect a battery with the heating element, thereby preventing the formation of frost on the window.

3 Claims, 4 Drawing Sheets

ANTI-FROST SYSTEM FOR A WINDSHIELD OF A MOTOR VEHICLE

BACKGROUND OF THE INVENTION

The present invention relates to a system for preventing frost from accumulating on a vehicle window such as a windshield.

In order to prevent frost from accumulating on a windshield of a vehicle, Japanese Patent Laid Open No. 58-174046 discloses an electric circuit where an ambient temperature sensor, switch responsive to the output of the sensor, and a time relay are provided between a battery and a wiper motor. When the ambient temperature decreases below a predetermined temperature while the vehicle is parked, the sensor, switch and the time relay are actuated in turn so as to intermittently drive the wiper motor. Thus, wipers wipe away the frost on the windshield. However, the wipers only clear a certain area of the windshield so that a field of view is limited to a predetermined range.

U.S. Pat. No. 4,084,126 discloses a control system. In accordance with the system, a heating element of transparent metal film is embedded in a laminated windshield. When there is an ice accumulation on the windshield, a large amount of current flows from an alternator through the heating element at the start of the vehicle so that the windshield is de-iced in two to four minutes. However, in order to obtain a necessary current, a high voltage must be applied to the heating element. Therefore, means such as a DC/AC converter for converting direct current into alternating current is necessary, which causes the cost of the device to rise. In addition, a large amount of power more than 1500 watt is consumed for de-icing at a time. Accordingly, an alternator and battery having large capacities must be provided.

SUMMARY OF THE INVENTION

The object of the present invention is to provide a system which may prevent accumulations of frost on a windshield, at a low voltage and with a small power.

According to the present invention, there is provided a system for preventing frost from accumulating on a window of a motor vehicle comprising a heating element provided on the window, a manual switch, a temperature switch closing when the temperature of the window is lower than 0° C., a humidity switch closing when the humidity of air outside of the window becomes slightly lower than 100% relative humidity, an electric circuit connecting the heating element, manual switch, temperature switch and humidity switch to a battery in series.

In an aspect of the invention, the circuit is connected to the battery through a relay switch which is closed when an ignition switch of an engine of the motor vehicle is closed, and the heating element is made of transparent conductive material embedded in the window.

The other objects and features of this invention will become understood from the following description with reference to the accompanying drawings.

DETAILED DESCRIPTION OF THE PREFERRED EMBODIMENT

Figure 1:
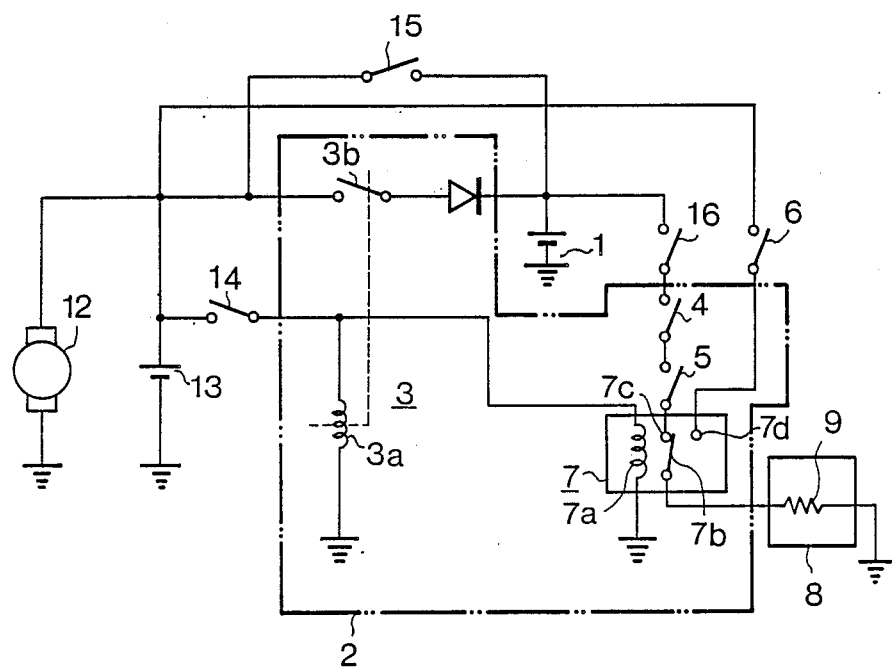
FIG. 1 shows an electric circuit for preventing accumulation of ice in accordance with the present invention.
Figure 2:
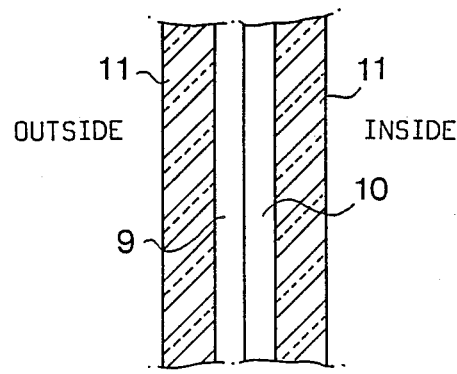
FIG. 2 is a sectional view of a part of a laminated windshield.

Referring to FIG. 1, an electric circuit of the present invention for preventing frost to accumulate on a windshield of a vehicle has a battery 1 exclusively used for a frost accumulation preventing circuit, a control unit 2, a heating element 9 of a transparent conductive film provided in a laminated windshield 8 of the vehicle, and manual defogging switch 6 and manual anti-frost switch 16, each switch provided on a dashboard of the vehicle. As shown in FIG. 2, the windshield 8 comprises a pair of glass sheets 11, interposing the heating element 9 at the outer side, and a transparent plastic film 10 at the innerside.

The control unit 2 has a relay 3 for connecting the battery 1 with an alternator 12 for charging the battery 1, a battery 13 for the vehicle, and a relay 7 for selectively connecting the heating element 9 with the frost accumulation preventing circuit and a defogging circuit. A temperature switch 4 which is closed when a surface temperature of the windshield 8 is below 0° C., and a humidity switch 5 which is closed just before the ambient air outside of the windshield 8 becomes saturated are connected between the anti-frost switch 16 and a fixed contact 7c of the relay 7 in series.

The relay 3 comprises a normally open switch 3b and a relay coil 3a connected to the battery 13 through an ignition switch 14. When the ignition switch 14 is closed, the relay coil 3a is energized to close the switch 3b so as to connect the battery 1 with the alternator 12 and the battery 13. Thus, the battery 1 is charged during the driving of the vehicle. The relay 7 has a relay coil 7a connected to the battery 13 through the ignition switch 14, movable contact 7b, and fixed contacts 7c and 7d. The movable contact 7b, in its normal position, connects the heating element 9 to the battery 1 through the switches 4, 5 and 16, thereby forming the frost accumulation preventing circuit. The defogging switch 6 is connected between the battery 13 and the fixed contact 7d.

When the ignition switch 14 is closed, the relay coil 7a is energized, so that the relay 7 engages the fixed contact 7d to connect the heating element 9 with the battery 13 through the defogging switch 6, thereby forming a defogging circuit.

A normally opened switch 15 is further provided in parallel to the relay switch 3b. When the switch 3b is closed, the battery 1 is connected with the battery 13 so as to be able to use the battery 1 as a power supply in case of an emergency when the battery 13 runs out.

Figure 3:
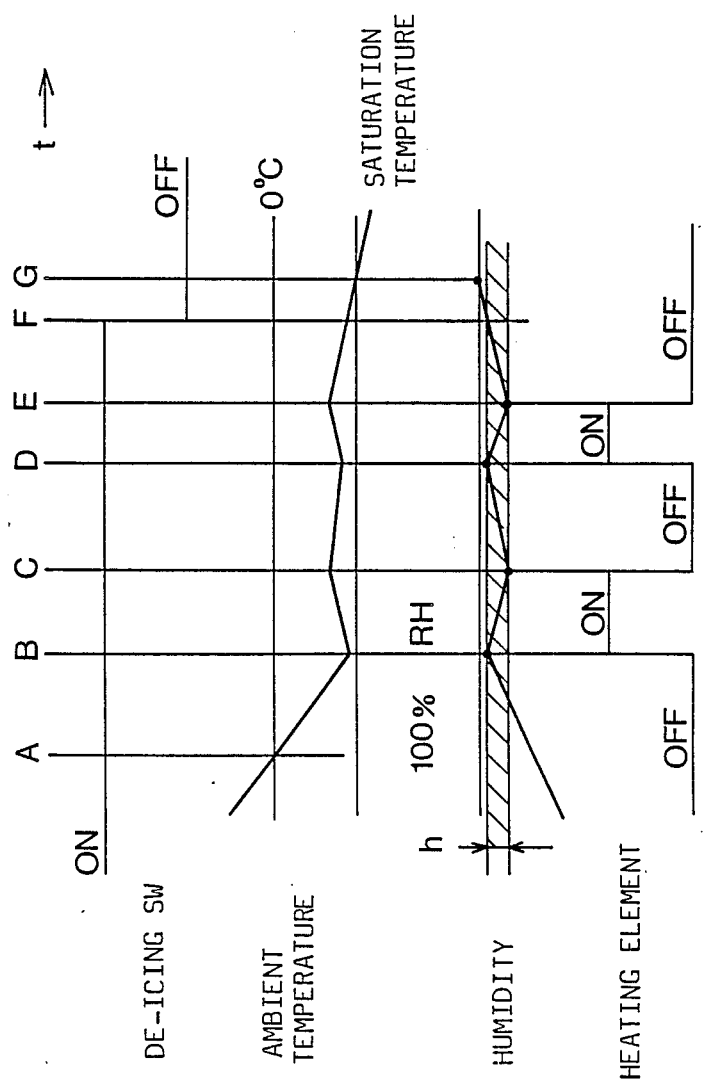
FIG. 3 is a graph describing the operation of the electric circuit.

The operation of the system will be described hereinafter. In order to prevent the frost from accumulating on the windshield during the parking of the vehicle, the anti-frost switch 16 is closed. The movable contact 7b of the relay 7 engages the fixed contact 7c to connect the heating element 9 with the frost accumulation preventing circuit. When the surface temperature of the windshield 8 becomes below 0° C. at a time A in FIG. 3, the temperature switch 4 is closed. If the humidity in the atmosphere is low, the humidity switch 5 is kept open so that the heating element 9 is not energized.

Figure 4:
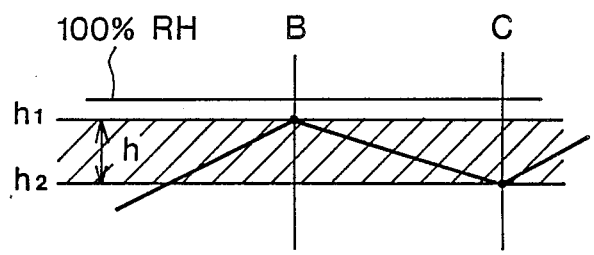
FIG. 4 shows an enlarged portion of the graph of FIG. 3.

When the temperature of the ambient air decreases and the humidity rises to a value h1 (FIG. 4), where the humidity is slightly lower than the saturation, that is 100% relative humidity, at a time B, the humidity switch 5 is closed. Accordingly, the heating element 9 is connected with the battery 1, thereby heating the windshield 8. The outer surface of the windshield 8 is heated so that the temperature of the air contacting thereto rises, thereby lowering the humidity (time B to time C) so as to prevent the build up of frost on the windshield.

As the humidity becomes lower than a value h2 which is smaller than the value h1, the humidity switch 5 is opened so as to cut the current to the heating element 9, thus, preventing a waste of power of the battery 1 (between time C and time D). The ambient temperature decreases again, so that the ambient humidity increases to the value h1. The humidity switch 5 is again closed at the time D. The operation of the system is thus repeated as the humidity varies between the limit values h1 and h2, so as to provide a hysterisis effect. Therefore, the current intermittently flows through the heating element 9 so that the frost is effectively prevented from forming on the windshield with only a small power consumption. When the ambient temperature becomes higher than 0° C., the temperature switch 4 is opened so that the windshield 8 is not uselessly heated.

When the ignition switch 14 is closed, movable contact 7b engages with the fixed contact 7d to connect the heating element 9 with the defogging circuit. If the defogging switch 6 is closed, current from the battery 13 flows passing through the heating element 9. Accordingly, the windshield 8 is heated to prevent the mist from forming on the inside of the windshield.

When the ignition switch 14 is closed, the relay switch 3b also closes so as to connect the battery 1 with the alternator 12. Accordingly, the battery 1 is charged while the vehicle is driven.

From the foregoing, it will be understood that the present invention provides an anti-frost windshield by keeping the windshield at a temperature slightly higher than saturation temperature. The system can be operated with only a low voltage so that the power consumption can be reduced. Furthermore, a converter is not necessary and capacities of the alternator and the battery need not be increased so that increase of the cost can be restrained.

While the presently preferred embodiment of the present invention has been shown and described, it is to be understood that this disclosure is for the purpose of illustration and that various changes and modifications may be made without departing from scope of the invention as set forth in the appended claims.

What is claimed is:

1. A system for preventing frost from accumulating on a window of a motor vehicle comprising;
   a heating element provided on the window;
   a manual switch;
   a temperature switch closing when the temperature of the window is lower than 0° C.;
   a humidity switch closing when the humidity of air outside of the window becomes slightly lower than 100% relative humidity; and
   an electric circuit connecting the heating element, manual switch, temperature switch and humidity switch to a battery in series.

2. The system according to claim 1 wherein the circuit is connected to the battery through a relay switch which is closed when an ignition switch of an engine of the motor vehicle is closed.

3. The system according to claim 1 wherein the heating element is made of transparent conductive material embedded in the window.

* * * * *